(12) United States Patent
Fernando et al.

(10) Patent No.: US 12,035,768 B2
(45) Date of Patent: Jul. 16, 2024

(54) THIN COATED SUPPORTED GLOVE

(71) Applicant: Ansell Limited, Richmond (AU)

(72) Inventors: Koshali Gayathri Fernando, Moratuwa (LK); Mathotarallage Amani Rasika Mathota, Kelaniya (LK); Andarage Naveen Pradeep Kumara, Embilipitiya (LK); Withanage Priyantha Kumara Withanage, Kurunegala (LK); Imihamy Mudiyanselage Sanjeewa Herath, Colombo (LK)

(73) Assignee: Ansell Limited, Victoria (AU)

( * ) Notice: Subject to any disclaimer, the term of this patent is extended or adjusted under 35 U.S.C. 154(b) by 0 days.

(21) Appl. No.: 16/483,553

(22) PCT Filed: Feb. 9, 2018

(86) PCT No.: PCT/AU2018/000017
§ 371 (c)(1),
(2) Date: Aug. 5, 2019

(87) PCT Pub. No.: WO2018/145145
PCT Pub. Date: Aug. 16, 2018

(65) Prior Publication Data
US 2020/0128890 A1    Apr. 30, 2020

Related U.S. Application Data

(60) Provisional application No. 62/456,736, filed on Feb. 9, 2017.

(51) Int. Cl.
*A41D 19/00*    (2006.01)
*B32B 27/12*    (2006.01)
(Continued)

(52) U.S. Cl.
CPC ........... *A41D 19/001* (2013.01); *D02G 3/328* (2013.01); *D04B 1/16* (2013.01); *D06N 3/0009* (2013.01);
(Continued)

(58) Field of Classification Search
CPC .. A41D 19/001; D06N 3/0056; D06N 3/0009; D06N 3/0025; D06N 2209/105;
(Continued)

(56) References Cited

U.S. PATENT DOCUMENTS

2007/0204381 A1* 9/2007 Thompson .............. B29C 59/02
2/159
2010/0186143 A1* 7/2010 Khoo ................... A41D 19/001
2/164
(Continued)

FOREIGN PATENT DOCUMENTS

CN    1678781 A    10/2005
CN    101674897 A    3/2010

OTHER PUBLICATIONS

"Elastane, n." OED Online. Oxford University Press, Jun. 2021. Web. Jul. 7, 2021. https://www.oed.com/view/Entry/249612? redirected From=elastane#eid (Year: 2021).*
(Continued)

*Primary Examiner* — Jenna L Johnson
(74) *Attorney, Agent, or Firm* — Moser Taboada

(57) ABSTRACT

A thin coated supported glove, having a thin knitted liner, wherein the thin knitted liner has a plurality of finger components, a thumb component, a backhand component, and a palm component. The thin knitted liner comprises a covered yarn having a first yarn and a second yarn, wherein the first yarn is a core yarn that is 20 denier or less, wherein the second yarn is at least one of an intermingled yarn or a first wrapping yarn surrounding the core yarn, wherein the
(Continued)

second yarn is 30 denier or less; and a thin polymeric coating adhered to the thin knitted liner.

12 Claims, 3 Drawing Sheets

(51) Int. Cl.
*D02G 3/32* (2006.01)
*D04B 1/16* (2006.01)
*D04B 1/28* (2006.01)
*D06N 3/00* (2006.01)

(52) U.S. Cl.
CPC ......... *D06N 3/0025* (2013.01); *D06N 3/0056* (2013.01); *D06N 2205/023* (2013.01); *D06N 2209/105* (2013.01); *Y10T 442/40* (2015.04)

(58) Field of Classification Search
CPC .... D06N 2205/023; D02G 3/328; D04B 1/16; Y10T 442/40
See application file for complete search history.

(56) References Cited

U.S. PATENT DOCUMENTS

| | | | |
|---|---|---|---|
| 2010/0186457 A1 | 7/2010 | Zhu | |
| 2013/0319055 A1* | 12/2013 | Tatsumi | D02G 3/322 66/174 |
| 2014/0000006 A1 | 1/2014 | Perera et al. | |
| 2014/0165251 A1* | 6/2014 | Prickett | D02G 3/442 2/2.5 |
| 2015/0118425 A1 | 4/2015 | Dapsalmon | |
| 2015/0135403 A1 | 5/2015 | Mercado et al. | |
| 2016/0017521 A1 | 1/2016 | Thomson et al. | |
| 2016/0051412 A1 | 2/2016 | Moreland et al. | |
| 2016/0262469 A1* | 9/2016 | Fernando | D04B 1/28 |
| 2016/0286874 A1* | 10/2016 | Kishihara | A41D 19/0006 |

OTHER PUBLICATIONS

Celanese Complete Textile Glossary—I, N & Y. (Year: 2001).*
Choi et al. "Three Dimensional Seamless Garment Knitting on V-Bed Flat Knitting Machines" JTATM vol. 4, Issue 3, 2005. (Year: 2005).*
Hari. "Ch 1—Types and Properties of Fibres and yarns Used in Weaving" from Woven Textiles—Principles, Technologies, and Applications, 2012. (Year: 2012).*
Spencer, David J. Knitting Technology. Ch 3—General Terms and Principles of Knitting Technology. (Year: 1983).*
International Search Report for PCT Application No. PCT/AU2018/000017 dated Mar. 7, 2019.
Extended European Search Report for Application 18751082.1 dated Dec. 16, 2020.

* cited by examiner

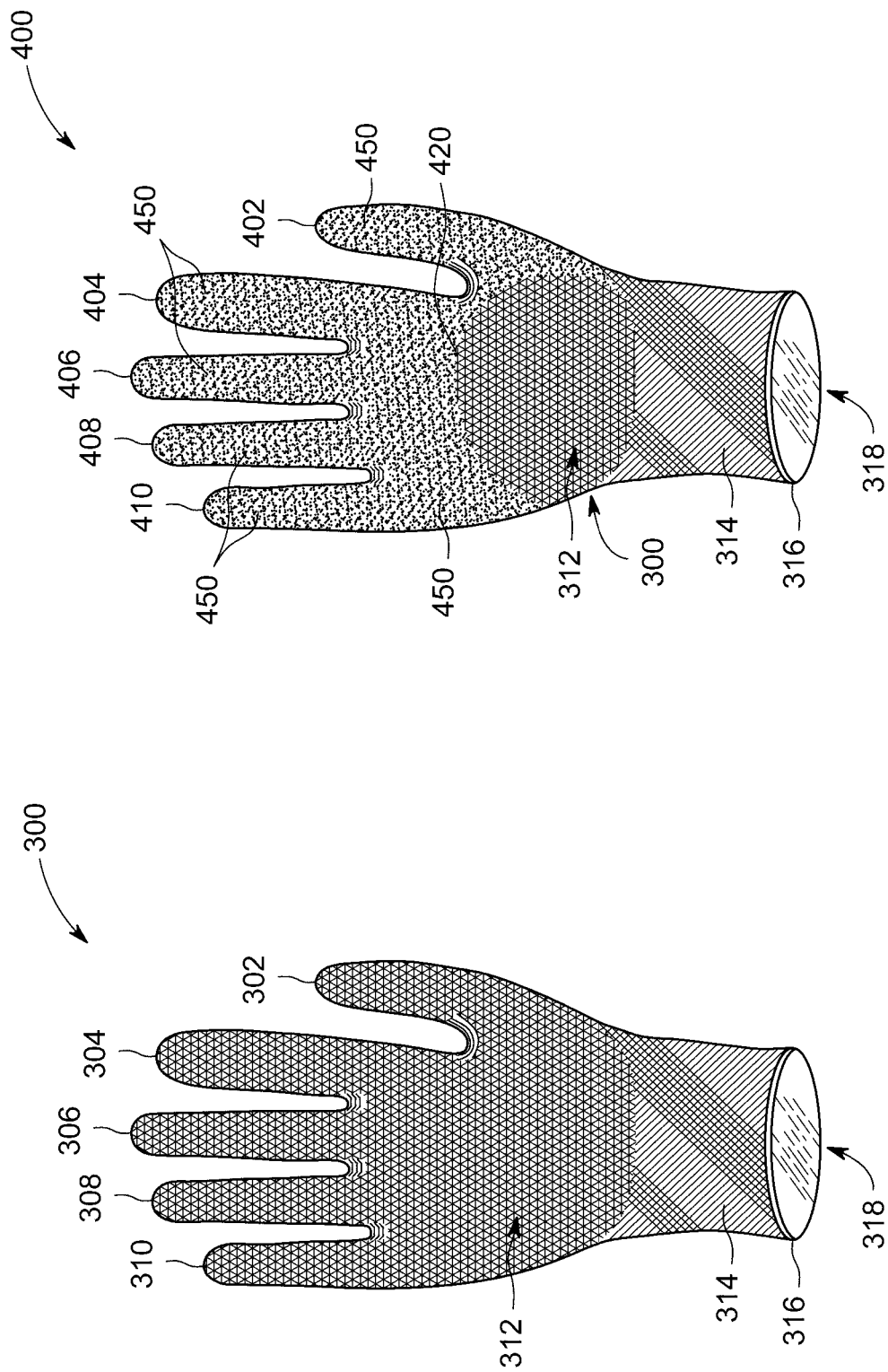

THIN COATED SUPPORTED GLOVE

FIELD

Embodiments of the disclosure generally relate to personal protective equipment and, more particularly, to thin coated supported gloves.

BACKGROUND

Gloves are commonly used to protect hands in industrial or household environments. A supported glove is a glove having a fabric liner that is at least partially coated with a coating, such as a polymeric coating. Supported gloves combine durability with relative comfort.

Fabric liners for supported gloves, which may be woven or knitted, are fabricated from relatively thick yarns, for example, a 319 denier yarn. Denier is defined as the weight of 9000 meters of a yarn in grams. The weight of any yarn described herein may also be expressed in SI units. Decitex (dtex) is defined as the weight of 10000 meters of a yarn in grams. As denier increases, the cross-sectional area of the cylinder-shaped yarn, i.e., the diameter, must also increase in order to increase the mass of the yarn sufficiently within the same fixed length of 9000 meters. A 319 denier yarn is generally knitted using a 15-gauge needle(s), indicating 15 needles per inch. A smaller sized yarn, such as a 221 denier yarn, is typically knitted using an 18-gauge needle(s). Knitted stitches of 319 denier yarn using a 15-gauge needle will therefore be spaced further apart than knitted stitches of 221 denier yarn using an 18-gauge needle. Since the diameter of a 221 denier yarn is smaller than that of a 319 denier yarn, the 221 denier yarn, and the knitted liner made therefrom, has smaller spaces (interstices) between the knitted courses of the knitted liner. The interstices between knitted courses in a knitted liner are generally spaced one to three times the yarn diameter. A liner knitted by an 18-gauge needle is approximately 30% lighter than a liner knitted with a 15-gauge needle. Therefore, a knitted liner having 221 denier yarns is lighter, thinner and more flexible than a knitted liner with 319 denier yarn. By way of example, a 300 denier nylon 66 yarn comprises a weight of 0.0333 g per 100 cm, a volume of 0.0303 cm3 per 100 cm, and a diameter of 0.07 mm while a 150 denier yarn of nylon 66 comprises a weight of 0.0166 g per 100 cm, a volume of 0.0152 cm3 per 100 cm, and a diameter of 0.005 mm.

The flexibility of a glove is influenced by the geometry of the polymeric coating of the glove. An elastic beam having a width 'B', a thickness 'T', and a length subjected to a central load 'P' has a maximum deflection '6' at the load point given by the equation:

$$\delta = \frac{PL^4}{48EI};$$

where 'E'=elastic modulus and I=moment of inertia about the neutral axis per:

$$I = \frac{BT^3}{12};$$

where 'B' is the beam width and 'T' is the beam thickness. A similar relationship exists for other loading geometries of 'P'. The deflection, 'δ', is inversely proportional to the third power of the thickness 'T'. Therefore, decreasing the thickness of the beam by 30 percent results in an increase in flexibility by a factor of 2.91, or nearly three.

Previously, if one would like to manufacture a robust coated glove, e.g., a 15 gauge knitted liner with a commensurately thick coating is required. If a thinner glove is desired, e.g., a knitted liner knitted with a 221 denier yarn can be used. However, a 221 denier yarn presents a knitted liner having a higher packing density of knitted stitches per square unit area, wherein a smoother, thinner coating disposed thereon results.

However, where one would like a coated glove that is yet thinner, lighter, more flexible, a thinner yarn must be used, which allows a less stiff knitted article. The combination of the thinner coating layer and the thinner knitted layer allows a much more flexible glove. However, the properties of the polymeric coating, in order to achieve robust adhesion, must be balanced versus the properties of the knitted liner. Because of the smaller diameter of the thinner yarn and smaller needles, the interstices of the knitted article may become excessively dense thus limiting the penetration of the polymeric coating, resulting in poor adhesion. Conversely, if the interstices are too open, as is also possible when knitting small diameter yarns with larger needles, the polymeric coating would fully penetrate the article and limit flexibility.

Also, one skilled in knitting would not knit a yarn having a denier of, for example, 280 or more with an 18 gauge needle(s) because the diameter of the yarn would be too large for an 18 gauge needle(s). And, one skilled in knitting would not knit a yarn having a denier of 100 or less using 18 gauge needle(s) because the interstices be too large, and coating an 18-gauge knitted liner having 100 denier yarns would lead to strikethrough. In addition, 18-gauge knitted liners having a polymeric coating adhered thereto still present as a less than flexible supported glove.

Also, at least one other problem associated with thin coatings is durability. Coating thin liners with thin coatings has always been challenging. Thin coatings tend to wear or abrade easily. Also, polymeric coatings on supported gloves are typically not breathable. Coatings can be made to be breathable by foaming the polymeric coatings, either by the introduction of air into a polymeric emulsion via a physical admixing of air and/or chemical blowing agents. However, foamed coatings are even less durable than non-foamed coatings. Moreover, chemical blowing agents tend to be skin sensitizers.

Thin coated supported gloves comprising thin fabric liners having thin polymeric coatings adhered thereto and methods of making the thin coated supported gloves are provided.

SUMMARY

Embodiments according to the disclosure include thin coated supported gloves comprising 21-gauge knitted liners having a thin polymeric coating adhered thereto, forming thin coated supported gloves, and methods for manufacturing the supported gloves, substantially as shown in and/or described in connection with at least one of the figures, as set forth more completely in the claims, are disclosed. Various advantages, aspects, and novel features of the present disclosure will be more fully understood from the following description and drawings.

In some embodiments, a thin coated supported glove, includes: a thin knitted liner, comprising a plurality of finger components, a thumb component, a backhand component, and a palm component, wherein the thin knitted liner comprises a covered yarn having a first yarn and a second yarn, wherein the first yarn is a core yarn that is 20 denier or less, and a second yarn, wherein the second yarn is at least one of an intermingled yarn or a first wrapping yarn surrounding the core yarn, wherein the second yarn is 30 denier or less; and a thin polymeric coating adhered to the thin knitted liner. In embodiments, a second wrapping yarn that wraps the first wrapping yarn. In some embodiments, the second wrapping yarn is a 20 denier yarn or less. In some embodiments, the thin knitted liner is a 21-gauge liner.

In some embodiments, a method for manufacturing a thin coated supported glove, includes: dressing a 21-gauge knitted liner on a hand-shaped former; applying an aqueous coagulant solution that comprises a 12-16% weak acid concentration to the 21-gauge knitted liner; dipping the 21-gauge knitted liner into a polymeric emulsion, wherein the polymeric emulsion is a 40-46 PHR nitrile-butadiene polymer formulation, forming a polymeric coating on the knitted liner; and curing the polymeric coating to form a thin coated support glove. In some embodiments, the polymeric emulsion has a viscosity between 200-300 centipoises during the dipping step. In some embodiments, the polymeric emulsion comprises a total solids content of 40-46% by weight of the total composition.

The foregoing summary is not intended, and should not be contemplated, to describe each embodiment or every implementation of the present disclosure. Other and further embodiments within the scope of the present disclosure are described below.

BRIEF DESCRIPTION OF THE DRAWINGS

FIG. 3 shows a diagram of a thin knitted liner; according to embodiments of the disclosure;

FIG. 4 shows a diagram of a thin knitted liner having a thin coating disposed on the thin knitted liner, forming a lightweight thin supported glove; according to embodiments of the disclosure.

DETAILED DESCRIPTION

Figure 1:
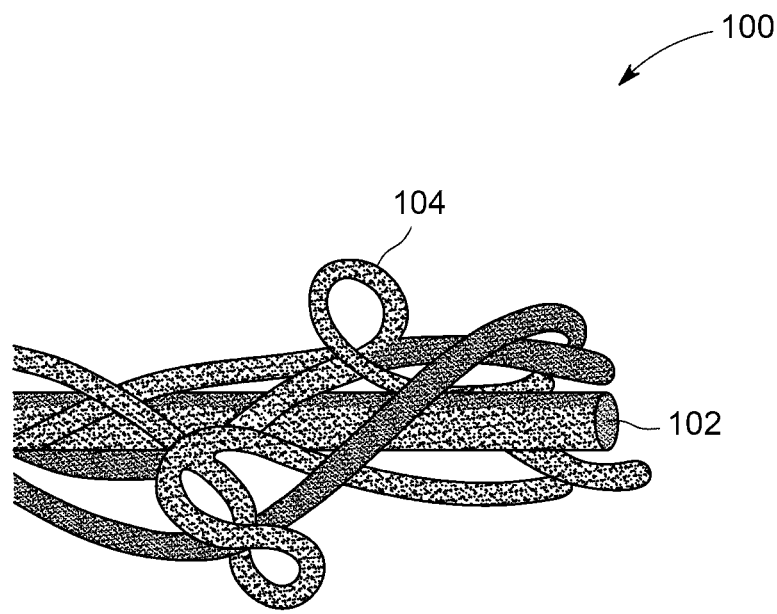
FIG. 1 shows a diagram of a first covered yarn, according to embodiments of the disclosure.

Before describing embodiments of the present disclosure in detail, the terminology used herein is for the purpose of describing particular embodiments only, and is not intended to be limiting. The disclosure should not necessarily be limited to specific compositions, materials, designs or equipment, as such may vary. All technical and scientific terms used herein have the usual meaning that is conventionally understood by persons skilled in the art to which embodiments of this disclosure pertain, unless context defines otherwise. Also, as used in this specification and the appended claims, the singular forms "a," "an," and "the" may include plural referents unless the context clearly dictates otherwise.

The term "flexing" or "flex" refers to finger movements, such as bending fingers, making a fist, gripping, grasping, clenching or otherwise folding the fingers.

The terms "emulsion," "dispersion," and "suspension" are generally analogous and indicate a system in which small particles of a substance, such as rubber particles, are mixed with a fluid (such as water and/or alcohols and/or other organic fluids) but are at least partially undissolved and kept dispersed by agitation (mechanical suspension) and/or by the molecular forces in a surrounding medium (colloidal suspension). Any embodiment of the disclosure contemplated herein may further comprise emulsions having typical and suitable components for rubber or elastomeric formulations, such as accelerators, such as guanidines, thiazoles, thiurams, sulfenamids, thioureas, dithiocarbamates, and xanthanates. Emulsions according to embodiments of the disclosure may further comprise surfactants, such as sodium dodecyl sulfates and polyvinyl alcohols, activators, such as zinc oxides, cross-linking agents and curatives, such as elemental sulfur and/or polysulphidic donors, such as xanthogens, such as dibutyl xanthogen disulfides and/or diisopropyl xanthogen disulfides. The emulsions contemplated herein may also comprise other additives, such as antioxidants, anti-ozonants, rheology-modifiers and thickening agents, such as various clays and aluminosilicates, pH adjusters, such as hydroxides, such as potassium hydroxide and/or ammonium hydroxide, pigments, processing agents, waxes/lubricating agents, and/or fillers as are known to those in the art.

The term "polymer" generally includes, but is not limited to, homopolymers, copolymers, such as for example, block, graft, random and alternating copolymers, terpolymers, etc., whether branched or linear polymers, and blends and modifications thereof. Furthermore, unless otherwise specifically limited, the term "polymer" includes all possible geometrical configurations of the molecule, including, but are not limited to, isotactic, syndiotactic and random symmetries.

The term "thermoplastic" generally includes polymer materials that become reversibly pliable, moldable, and heatable above a specific temperature and solidify upon cooling. The term "thermoset" generally includes are polymer materials that strengthen following heating and solidification, but cannot be successfully remolded or reheated after an initial heat-forming due to cross-linking. The term "thermoplastic elastomer" (TPE) are a class of copolymers comprising both thermoplastic and elastomeric/thermoset materials properties and generally have crosslinking between adjacent polymeric molecular chains, generally allowing materials made therefrom to be re-heatable. The term "rubber" generally indicates elastomers produced from natural rubber latexes or synthetic elastomers.

Exemplary thermoplastics include, without limitation, polychloroprenes, butyl rubbers, natural rubber, synthetic polyisoprenes, poly(vinyl) chlorides, polyesters, polyamides, polyfluorocarbons, polyolefins, polybutadienes, polyurethanes, polystyrenes, poly(vinyl) alcohols, and copolymers of the foregoing, and elastomeric polymers such as elastic polyolefins, copolyether esters, polyamide polyether block copolymers, block copolymers having the general formula A-B-A' or A-B like nitrile-butadiene rubber (NBR), styrene-poly(ethylene-propylene)-styrene, styrene-poly(ethylene-butylene)-styrene, (polystyrene/poly(ethylene-butylene)/polystyrene, poly(styrene/ethylene-butylene/styrene), copoly(styrene/ethylene-butylene), A-B-A-B tetrablock copolymers and the like and/or blends of any of the foregoing.

FIG. 1 shows a diagram of a first covered yarn 100, according to embodiments of the disclosure. The first covered yarn 100 comprises a core yarn 102 and an intermingled yarn 104, which covers the core yarn 102. In at least one embodiment according to the disclosure, the core yarn 102 is an elastomeric yarn, such as an elastane yarn and/or polyester yarn, e.g., LYCRA® or SPANDEX®. The core yarn 102 may be, for example, a 20 denier yarn. Also, in at least one embodiment according to the disclosure, the intermingled yarn 104 is a nylon or polyamide yarn, such as a nylon 6 or a nylon 6,6 yarn (also expressed as nylon 66). In at least one embodiment according to the disclosure, the intermingled yarn 104 is a 30 denier yarn. The total denier of the first covered yarn 100 is therefore approximately a 50 denier. Embodiments according to the disclosure further comprise yarns wherein the first covered yarn may comprise polyester yarns, filaments, staple fibers, and the like. Embodiments according to the disclosure further comprise yarns such as high performance polyethylene (HPPE) or ultra-high molecular weight polyethylene (UHMWPE) yarns, filaments, staple fibers, and the like. Embodiments according to the disclosure further comprise para-aramid and/or meta-aramid yarns, fibers, and/or filaments. Any of the yarns contemplated herein may comprise glass fibers, steel yarns, ceramic fibers, and other fibers and filaments known to those in the art.

Figure 2:
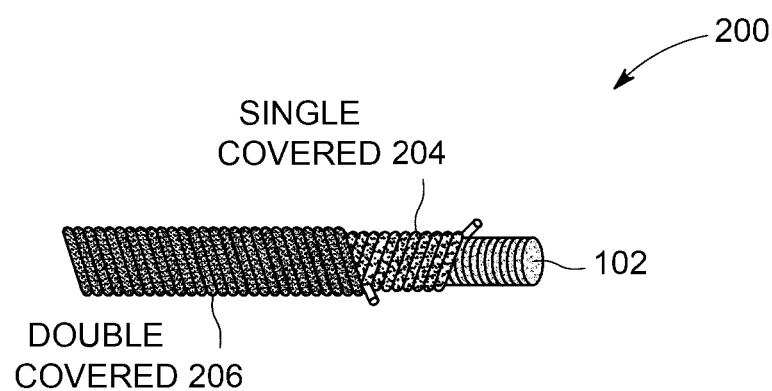
FIG. 2 shows a diagram of a second covered yarn, according to embodiments of the disclosure.

FIG. 2 shows a diagram shows a diagram of a second covered yarn 200, according to embodiments of the disclosure. The second covered yarn 200 comprises a core yarn 102 and at least one wrapping yarn 204, which covers the core yarn 102. As above, in at least one embodiment according to the disclosure, the core yarn 102 is an elastomeric yarn, such as an elastane yarn, e.g., LYCRA® or SPANDEX® and may be, for example, a 20 denier yarn. Also, in at least one embodiment according to the disclosure, a first wrapping yarn 204 is a nylon yarn, such as a nylon 6 or a nylon 6,6 yarn and may be, for example, a 30 denier yarn. Also, in at least one embodiment according to the disclosure, a second wrapping yarn 206 is a nylon yarn wrapped, such as in an S or Z wrapping configuration, around the first wrapping yarn 204. Embodiments according to the disclosure further comprise yarns, wherein the second wrapping yarn 206 is, for example, a 30 denier yarn. The total denier of a second covered yarn 200 having a second wrapping yarn 206 is therefore approximately a 70 denier. The first covered yarn 100 and/or the second covered yarn(s) 200, because these are approximately 70 denier or less, may be knitted using 21-gauge needles.

Embodiments according to the disclosure further comprise yarns wherein the second covered yarn 200 may comprise polyester yarns, filaments, staple fibers, and the like, high performance polyethylene (HPPE) or ultra-high molecular weight polyethylene (UHMWPE) yarns, filaments, staple fibers, and the like, glass fibers, steel yarns, and other fibers and filaments known to those in the art.

FIG. 3 shows a diagram of a thin knitted liner 300; according to embodiments of the disclosure. The thin knitted liner 300 comprises a thumb 302, an index finger 304, a middle finger 306, a ring finger 308, a little finger 310, a knuckle area 312, and, optionally, a cuff area 314 and/or a bead 316. The thin knitted liner 300 further comprises an opening 318 for a wearer to don the thin knitted liner 300. It is to be understood that the thin knitted liner 300 also comprises a palm area that is not shown in this view. The thin knitted liner 300 is knitted using a knitting machine, such as a V-bed knitting machine, e.g., supplied by Shima Seiki Mfg., having 21-gauge needles spaced such that there are 21 needles per inch. A gaugeless 21-gauge needle machine may also be used to knit any thin knitted liner contemplated herein, such as the thin knitted liner 300. The thin knitted liner 300 is knitted using, for example, the first covered yarn 100 or the second covered yarn(s) 200 as described above. Embodiments according to the disclosure further comprise a coating to form a supported glove, as described further below.

With regard to nylon 66, which has a density of 1.1 g/cm3, a 70 denier nylon 66 yarn comprises a weight of 0.0077 g/100 cm, a volume of 0.007 cm3/100 cm, and a diameter of 0.033 mm. These figures reflect the measurements for a single monofilament yarn. Considering the core yarn 102, i.e., the 20 denier elastane yarn, which has a density of 1.3 g/cm3, comprises a weight of 0.002 g/100 cm, a volume of 0.0017 cm$^3$/100 cm, and a diameter of 0.016 mm. The first covered yarn in which these two yarns are combined produce a diameter of approximately 0.05 mm. Therefore, a thin knitted liner 300, knitted using the first covering yarn 100, has a cross-sectional thickness of, nominally, 0.10 mm. Because these yarns are sometimes produced by twisting multiple strands of finer filaments, using processes as are known to those in the art, the yarn diameter may be somewhat larger and, correspondingly, the knitted liner may be somewhat thicker. Also, the thin knitted liner 300, if coated with the polymeric emulsion, tends to compress the yarns, providing a thin knitted liner 300 having a lesser thickness, i.e., shrinkage of the thin knitted liner 300. In some embodiments according to the disclosure, the thickness of the polymeric coating (discussed below) approximates the thickness of the thin knitted liner 300. The following is a table of the diameters of common fibers for various monofilament yarns having the stated denier.

| Fiber | Denier (g/9000 m) | Density (g/cm$^3$) | Diameter (mm) | CS Area (cm$^2$) |
|---|---|---|---|---|
| Nylon 6,6 | 300 | 1.10 | 0.139 | 0.000303 |
| UHMWPE | 221 | 0.97 | 0.180 | 0.000250 |
| Nylon 6,6 | 221 | 1.10 | 0.166 | 0.000210 |
| Polyester | 221 | 1.30 | 0.302 | 0.000170 |
| Kevlar | 221 | 1.44 | 0.147 | 0.000170 |
| Nylon 6,6 | 150 | 1.10 | 0.098 | 0.000151 |
| Nylon 6,6 | 70 | 1.10 | 0.067 | 0.000070 |
| Nylon 6,6 | 30 | 1.10 | 0.014 | 0.000030 |
| Polyester | 20 | 1.30 | 0.033 | 0.000017 |

FIG. 4 shows a diagram of the thin knitted liner 300 having a thin coating 450 disposed on the thin knitted liner 300, forming a thin supported glove 400; according to embodiments of the disclosure. The thin supported glove 400 comprises a coated thumb 402, a coated index finger 404, a coated middle finger 406, a coated ring finger 408, a coated little finger 410, a coated knuckle area, an uncoated cuff area 314, and/or optionally the bead 316. Alternatively or additionally, the thin coating 450 is indicated by the darker shaded areas, noting that a texture of the thin knitted liner 300 can still be viewed under the thin coating 450. A cross-sectional thickness of the thin lightweight supported glove 400 generally ranges from 0.50 mm to 0.75 mm or approximately thereof. The thin supported glove 400 further comprises the opening 318 for a wearer to don the thin supported glove 400.

It is to be understood that the thin knitted liner 300 also comprises a coated palm area that is not shown in this view. Embodiments according to the disclosure further comprise a coating to form a supported glove wherein a three-quarter-dipped supported glove, which covers an upper backhand area 420 with the thin coating 450. It is to be further understood that other styles of dipping, as are known to those in the art, are within the scope of embodiments of the disclosure of the thin coated supported glove. For example, embodiments optionally include a knuckle-dipped supported glove (in which an upper backhand area 420 would not be coated), a full-dip supported glove, a palm-dip supported glove, and/or the like.

The inventors have unexpectedly overcome problems associated with previous methods for coating thin liners with thin coatings. Therefore, optionally, 21-gauge needle-knitted liners, which are thin, can be coated with aqueous polymeric emulsions, for example, aqueous polyurethanes, and/or blends or aqueous polyurethanes with other aqueous emulsions. For example, a blend of a nitrile-butadiene (NBR) emulsion with an aqueous polyurethane emulsion. Also, 21-gauge needle-knitted liners can be coated with aqueous NBR or NBR blends. The inventors have unexpectedly produced thin knitted liners 300, wherein the thin coating 450 and even more especially so in regards with disposing a thin aqueous polymeric coating, is disposed onto the thin knitted liner 300, producing a thin coated supported glove that is thin, flexible, durable and, optionally, breathable.

The thin supported glove 400, according to embodiments of the disclosure, comprises the thin coating 450, wherein an EN388 level 4 Abrasion (>8000 cycles) is achieved despite being thin. Alternatively, the thin coating 450 is not-foamed but maintains breathability and abrasion resistance. Without intending to be bound by theory, it is thought that the thin knitted liner 300 and the thin coating 450, because each is integrally formed within each other in creating the thin coated supported glove 400 and because the yarn(s) are penetrated by the thin coating 450 without strikethrough, e.g., allows "channels" to form, providing breathability. Moreover, excellent adhesion of the yarn(s) and the thin coating provides high abrasion despite the thinness of the thin coated supported glove. In this context, integrally formed means that the yarns of the thin knitted liner 300 are penetrated by the thin coating 450 to an extent where disassembly is not possible without destroying either the thin knitted liner 300 or the thin coating 450.

At least one thin coating 450, according to embodiments of the disclosure, is formulated using the formula, which is dimethyl formamide (DMF)-free, as described in Table 1. The polymeric emulsion has a low viscosity, by way of example and not limitation, a viscosity in the range of 200-400 centipoises at, for example, 20-40° C. Additionally, in some exemplary embodiments according to the disclosure, the viscosity of the polymeric emulsion is approximately 250-300 centipoises at, for example, 24-30° C. In some embodiments, the polymeric emulsion may comprise commonly used stabilizers including but not limited to potassium hydroxide, ammonia, aluminum sulfates, sulfonates and others known to those in the art. The polymeric emulsion may comprise other commonly used components, such as surfactants, anti-microbial agents, fillers/additives, and/or the like. The amounts of the components within Table 1 are expressed in parts-per-hundred weight dry rubber (PHR) as is known to those in the art.

TABLE 1

| TSC (% by weight) | Component | Parts per hundred rubber (PHR) |
|---|---|---|
| 40-46 | NBR or NBR blend | 100 |
| 15-25 | Ammonium hydroxide | 0.1-0.5 |
| 40-60 | Curing agent(s) | 2.5-4.5 |
| 30-40 | Waxes/Lubricating agent(s) | 0.2-2.5 |
| 100 | Pigments | 1.0-3.0 |
| 100 | Thickening agent(s) | 0.01-0.1 |
| Total 40-46 | | |

The polymeric emulsion of Table 1 comprises an unexpectedly low viscosity while having a very high total solids content (TSC), allowing a thin coating to penetrate the fibers of which the yarns are comprised while nonetheless inhibiting strikethrough, i.e., wherein the polymeric emulsion penetrates far enough into the thickness of the liner to contact the skin when the glove is worn. At least one exemplary embodiment according to the disclosure comprises a formulation unexpectedly having a TSC of 42-44% and a viscosity of 200-300 centipoises at 24-28° C. Another embodiment includes a formulation having a TSC of 40-46 weight percent of the total composition. Also, at least one embodiment according to the disclosure comprises a thin coating 450 that is treated with a weak acid coagulant, such as acetic acid, formic acid, tricarboxylic acids, and other weak acids or any blends of these weak acids, so that the internal molecules of coating form additional cross-links. The thin coating 450 may then be treated with a strong coagulant to more fully gel and cross-link the outer molecules, producing a thin coating 450 that is through-hardened, i.e., gelled or cross-linked throughout a thickness of a polymeric layer, as opposed to case-hardening (a coating in which only the outer surfaces of the coating are fully cross-linked). The technology for producing a thin coating 450 that is through-hardened is disclosed in commonly-assigned US Publ. No. 20140000006 and is incorporated by reference in its entirety.

Referring to Table 1, in some embodiments, ammonium hydroxide may be present in an amount of about 0.1 to about 0.5 PHR, or about 0.1 to about 0.3 PHR. In some embodiments, curing agents may be present in amount of about 2.5 PHR to about 4.5 PHR. In some embodiments, wax and/or lubricating agents may be present in amount of about 0.2 PHR to about 1.5 PHR or about 0.2 PHR to about 2.5 PHR. In some embodiments, pigments, may be present in an amount of about 1.0 PHR to about 3.0 PHR. In some embodiments, thickening agents may be present in an amount of about 0.01 PHR to about 0.05 PHR, or about 0.01 PHR to about 0.1 PHR. In embodiments, a polymeric emulsion may comprise a total solids content of 40-46% by weight of the total composition.

Also, at least one embodiment according to the disclosure comprises a thin coating 450 that is treated with a salt treatment. The thin coating 450 may be treated with a salt bath, alternatively before or after a curing step, comprising salt particles, such as sodium chloride salt particles. The salt particles, in addition to becoming embedded in the thin coating 450, wherein multi-faceted textures are imparted, providing enhanced gripping properties, also provides additional strength, i.e., abrasion resistance to the thin coating 450. The technology for treating the thin coating 450 with a salt bath treatment is disclosed in commonly-assigned U.S. Pat. Nos. 7,378,043; 7,771,644; 7,814,570; 8,522,363, all of which are incorporated by reference in entirety.

Figure 5:
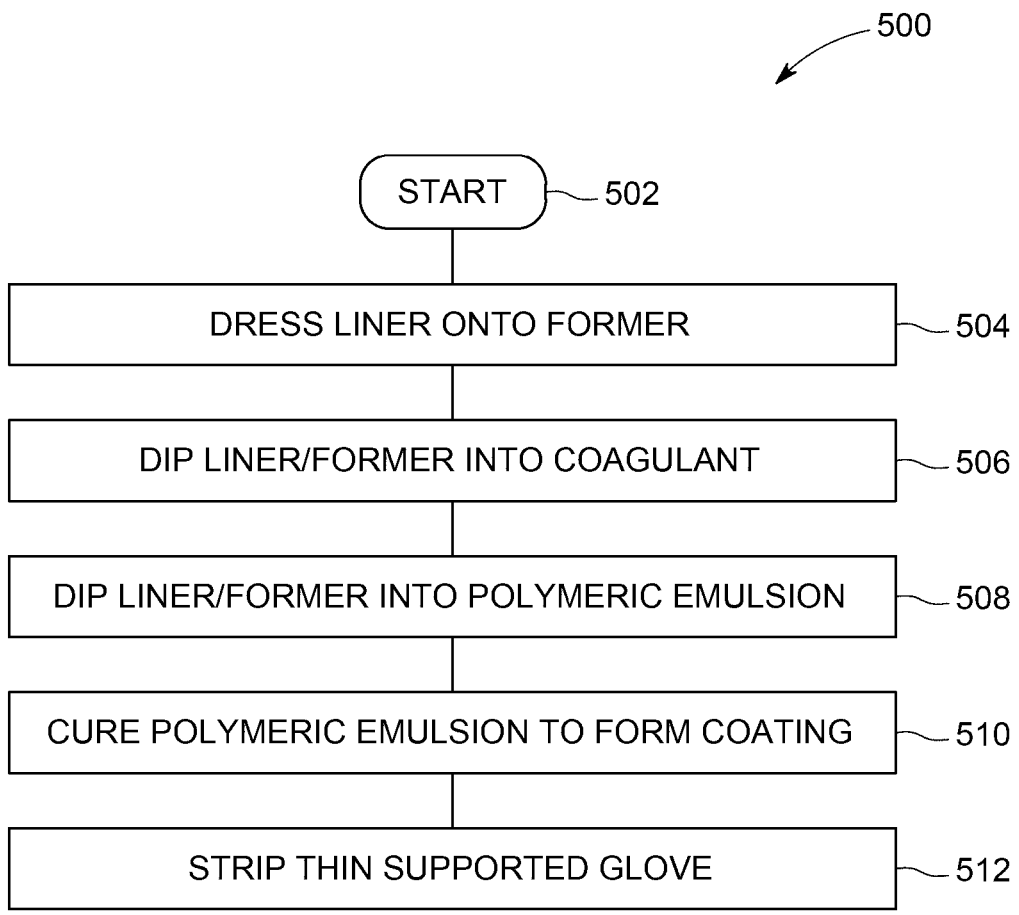
FIG. 5 depicts a method for manufacturing thin coated supported gloves; according to embodiments of the disclosure.

FIG. 5 depicts a method 500 for manufacturing thin coated supported gloves; according to embodiments of the disclosure. The method 500 starts at step 502 and proceeds to step 504, wherein a 21-gauge knitted liner, as described herein, is dressed on a hand shaped former. At step 506, the hand shaped former having the 21-gauge knitted liner is dipped into a coagulant solution and removed. The coagulant solution, according to embodiments of the disclosure, comprises approximately 10-20% aqueous concentration of a coagulant, for example, a 12-18% aqueous concentration of a weak acid, such as acetic acid and may further comprise a surfactant(s). The thin knitted liner having the coagulant solution contacts the polymeric emulsion, wherein it destabilizes the polymeric emulsion and gels the emulsion. Without intending to be bound by theory, it is believed that the weak acid coagulant allows a penetration, through-hardening, and adhesion of the thin coating to the thin knitted liner. Also, optionally, the coagulant solution that is disposed on the thin knitted liner may be heated to dry the coagulant solution. Also, optionally, the 21-gauge knitted liner first has a wetting agent disposed thereon before dipping into the coagulant solution.

At step 508, the hand shaped former having the 21-gauge knitted liner dressed thereon is then dipped into a polymeric emulsion, such as the polymeric emulsion created by the formula described in Table 1. The polymeric emulsion in Table 1 generally has a very low viscosity, e.g., 200-300 centipoises. The polymeric emulsion, as well as penetrating the yarns of the knitted liner, also unexpectedly does not penetrate the entire thickness of the knitted liner via the interstices, resulting in a thin coating that adheres well to the knitted liner without causing strikethrough, which can be uncomfortable to a wearer of a supported glove. The hand shaped former may be dipped in a palm dip, three-quarters dip, full dip, etc., as described above and removed, forming a polymeric coating on the 21-gauge, thin knitted liner. At step 510, the hand shaped former having the thin knitted liner and polymeric coating is then delivered to a curing oven. The hand shaped former having the thin knitted liner and polymeric coating may be subjected to, for example, 120° C. for approximately 40 minutes to cure the coating, wherein a thin coated supported glove is formed. Alternately, the coating may undergo a two or three-stage curing process, e.g., 110° C. for 30 minutes, 120° C. for 20 minutes, and/or 100° C. for 20 minutes.

At step 512, the thin supported glove is stripped from the hand shaped former and the method 500 ends. Other steps may be included in the method 500. For example, a washing step may be performed in hot water before the curing step or after the curing step. Also, a salt treatment and/or a weak acid treatment, as described above, may be used. Generally, the salt treatment will be performed before the curing step. Also, generally, the weak acid treatment may be performed before and/or after the curing step.

Therefore, at yarn cross-over points, when using a 70 denier yarn, the knitted liner will have a thickness of approximately 0.13 mm. Also, at yarn cross-over points, when using a 50 denier yarn, the knitted liner will have a thickness of approximately 0.11 mm. Wherein a 21-gauge needle knitted liner is coated with polymeric emulsion, forming a coating, the coating thickness is close to the thickness of the thin knitted liner, and the lightweight thin supported glove has a final thickness in the range of 0.50 mm to 0.61 mm. The overall weight of the lightweight thin supported glove comprising a 21-gauge knitted liner and a thin polymeric coating is, likewise, lighter. Alternatively or additionally, embodiments of the disclosure include a supported glove in which the coating, such as the thin coating 450, is a continuous coating. For example, the thin coating 450 covers the thin knitted liner, such as the thin knitted liner 300, without gaps.

As stated above, the gauge knitting needle used is generally selected according to the denier of the yarn being used. Although it is possible to use a larger gauge needle to knit smaller denier yarns, i.e., smaller diameter yarns, such a combination results in excessive spacing, i.e., interstices, between the yarn courses in the thin knitted liner, which would be larger than the desired spacing. The interstices spacing is typically in the range of one to three times the diameter of the yarn used to knit the liner, when a proper needle gauge is selected. The 15-gauge needle can use a 280 denier yarn, having an average yarn diameter of 0.19 mm, for a nylon yarn. The 18-gauge needle can use a 140 denier yarn, having an average yarn diameter of 0.16 mm for a nylon yarn. The 21-gauge needle can use a 70 denier yarn, having an average yarn diameter of 0.13 mm for a nylon 66 yarn. Furthermore, the difference between the yarn diameter and the interstices changes when the liner is put on a former so that the interstices diameter can be three times larger than the yarn diameter due to stretching of the thin knitted liner.

As stated above, coating knitted liners can be challenging. A 21-gauge knitted liner prepared from a covered two-ply yarn, such as a 30 denier nylon yarn twisted with a 20 denier elastane yarn, such as SPANDEX® or LYCRA® elastane yarns, is approximately 0.22 mm thick. A 30 denier nylon yarn twisted with 20 wraps of 20 denier elastane yarns produces a knitted liner that is approximately 0.26 mm thick. The 21-gauge knitted liner is coated with a polymeric emulsion to form a coating, resulting in a glove thickness of 0.50 mm to 0.62 mm. A glove having a 21-gauge knitted liner is coated with, for example, a nitrile-butadiene (NBR) emulsion or an NBR blend of emulsions, having complete penetration and has a thickness nearly equal to that of the knitted liner which is approximately 0.62 mm. In at least one embodiment according to the disclosure, the emulsion penetrates between 40-75% of the thickness of the knitted liner. In at least one embodiment according to the disclosure, the emulsion penetrates less than 60% of the thickness of the knitted liner and in some embodiments less than 50% and in some embodiments less than 40% of the thin knitted liner.

In one or more embodiments according to the disclosure, the polymeric emulsion is coated over selected portions of the glove generally including the palm and finger regions of the glove while the portion of the liner at the back of the hand are not coated with the polymeric emulsion, wherein breathability is promoted even further. Nonetheless, because of the breathability of the thin knitted liner and the thin coating, a full-dip style is an unexpected advance in the art. Also, in embodiments according to the disclosure, the polymeric emulsion comprises natural rubber, synthetic polyisoprene, styrene-butadiene, carboxylated or non-carboxylated acrylonitrile-butadiene, highly carboxylated acrylonitrile-butadiene (e.g., >35% carboxylation), polychloroprene, polyacrylic, butyl rubber, or water-based polyurethane (polyester based or polyether based), or combinations thereof.

In at least one embodiment according to the disclosure, the polymeric coating, e.g., the thin coating, is foamed using dispersed air cells in the range of 5 to 60% volumetric percentage forming closed cells or open cells with interconnected porosity in the polymeric layer. Closed cells provide a liquid proof polymeric coating that is highly flexible, soft and spongy, and provides good dry and wet grip. Closed cells are normally associated with air content in the 5 to 15% volumetric percent range. Open cells that are interconnected normally occur in the 15 to 50% air volumetric range and provide breathability of the glove through the foamed polymeric layer.

Due to the smaller diameter of the 50 or 70 denier yarns of which the thin knitted liner is comprised, the distance between the fibers decrease rapidly, forming a pinch region in the knitted liner and when the polymeric emulsion enters this region, the gelling action essentially chokes the ingress of the polymeric emulsion, wherein the penetration of the polymeric emulsion into the thickness of the thin knitted liner through the interstices is substantially prevented. This penetration and gelling action is a function of the viscosity of the polymeric emulsion and the depth to which the former with the coagulant coated liner is depressed into the polymeric emulsion. The higher the hydrostatic pressure, i.e., deeper penetration, the polymeric emulsion penetrates more into the thin knitted liner. Therefore, two controllable process variables are available for controlling the penetration of the polymeric emulsion into the thin knitted liner. These process variables are 1) the control of polymeric emulsion viscosity and 2) depth of immersion of the knitted liner dressed former. The thin lightweight supported glove described herein is approximately 30% less in weight and thickness compared to an 18-gauge glove, and has better than three times the flexibility.

Having thus described various aspects of the disclosure, it will be understood that such detail need not be strictly adhered to, but that additional changes and modifications may suggest themselves to one skilled in the art, all falling within the scope of the disclosure as defined by the claims.

The invention claimed is:

1. A coated supported glove, comprising:
a 21-gauge knitted liner, comprising a plurality of finger components, a thumb component, a backhand component, and a palm component, wherein the 21-gauge knitted liner is formed with a covered yarn consisting of a first yarn that is a core yarn and a second yarn that is an intermingled yarn or a first wrapping yarn, and optionally a third yarn that is a second wrapping yarn, wherein the first yarn is 20 denier or less, and the second yarn and optional third yarn are individually 30 denier or less; and
a non-foamed polymeric coating adhered to and integrally formed with the 21-gauge knitted liner without strikethrough,
wherein the coated supported glove has a cross-sectional thickness ranging from about 0.5 mm to 0.75 mm; and
wherein the covered yarn is a 50 to 70 denier yarn.

2. The coated supported glove of claim 1, wherein the second yarn is a first wrapping yarn, and further comprising the second wrapping yarn that wraps the first wrapping yarn.

3. The coated supported glove of claim 2, wherein the second wrapping yarn is a 20 denier yarn or less.

4. The coated supported glove of claim 2, wherein the first yarn is an elastane yarn.

5. The coated supported glove of claim 1, wherein the intermingled yarn or the first or second wrapping yarn is a nylon 6 or nylon 6,6 yarn.

6. The coated supported glove of claim 1, wherein the first yarn is an elastomeric yarn.

7. The coated supported glove of claim 1, wherein the non-foamed polymeric coating is formed with a polymeric emulsion having a total solids content ranging from 40-46%.

8. The coated supported glove of claim 1, wherein the supported glove has an EN388 abrasion level of 4 or greater.

9. The coated supported glove of claim 1, wherein the core yarn is a 20 denier elastane yarn.

10. The coated supported glove of claim 1, wherein the second yarn is a 30 denier polyamide intermingled yarn.

11. The coated supported glove of claim 1, wherein the 21-gauge knitted liner is prepared by a process of knitting the covered yarn in a V-bed knitting machine.

12. The coated supported glove of claim 11, wherein the V-bed knitting machine comprises 21-gauge needles spaced at 21 needles per inch.

* * * * *

UNITED STATES PATENT AND TRADEMARK OFFICE
CERTIFICATE OF CORRECTION

| | | |
|---|---|---|
| PATENT NO. | : 12,035,768 B2 | Page 1 of 1 |
| APPLICATION NO. | : 16/483553 | |
| DATED | : July 16, 2024 | |
| INVENTOR(S) | : Fernando et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 263 days.

Signed and Sealed this
Sixth Day of May, 2025

Coke Morgan Stewart
*Acting Director of the United States Patent and Trademark Office*